United States Patent
Tung et al.

(10) Patent No.: US 7,752,429 B2
(45) Date of Patent: Jul. 6, 2010

(54) COMPUTER SYSTEM AND BOOT CODE ACCESSING METHOD THEREOF

(75) Inventors: Yen-Ping Tung, Taipei Shien (TW); Chin-Tsai Yen, Taipei (TW); Te-Hsien Lai, Panchiao (TW); Ming-Chien Yang, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 675 days.

(21) Appl. No.: 11/730,839

(22) Filed: Apr. 4, 2007

(65) Prior Publication Data

US 2008/0046711 A1 Feb. 21, 2008

(30) Foreign Application Priority Data

Aug. 17, 2006 (TW) ............................. 95130274 A

(51) Int. Cl.
G06F 9/00 (2006.01)
G06F 15/177 (2006.01)

(52) U.S. Cl. .......................................................... 713/2
(58) Field of Classification Search .............. 713/1, 713/2
See application file for complete search history.

(56) References Cited

U.S. PATENT DOCUMENTS 6,668,374 B1 * 12/2003 Sten et al. .................... 717/173
7,313,685 B2 * 12/2007 Broyles et al. ................. 713/2
7,440,998 B2 * 10/2008 Hiray et al. .................. 709/203
2006/0020837 A1 * 1/2006 Rothman et al. ............. 713/310
2006/0059330 A1 3/2006 Ong et al.
2006/0136703 A1 * 6/2006 Wisecup et al. ................ 713/2
2007/0186086 A1 * 8/2007 Lambert et al. ................ 713/1
2007/0260790 A1 * 11/2007 Chen et al. ................... 710/110

FOREIGN PATENT DOCUMENTS

| CN | 1238087 A | 12/1999 |
|---|---|---|
| CN | 1599902 A | 3/2005 |
| TW | 200604933 | 2/2006 |

\* cited by examiner

*Primary Examiner*—Thomas Lee
*Assistant Examiner*—Brandon Kinsey
(74) *Attorney, Agent, or Firm*—Rabin & Berdo, P.C.

(57) ABSTRACT

A computer system comprising an embedded system and a main computer system is provided. The embedded system comprises a memory device and a virtual firmware hub. The memory device is for storing a boot code of the main computer system. The virtual firmware hub is connected to the main computer system. The virtual firmware hub is for reading the boot code. As the main computer system is booted, the main computer system inputs a loading command to the virtual firmware hub. The virtual firmware hub reads the boot code stored in the memory device according to the loading command and outputs the boot code to the main computer system accordingly.

12 Claims, 7 Drawing Sheets

COMPUTER SYSTEM AND BOOT CODE ACCESSING METHOD THEREOF

This application claims the benefit of Taiwan application Serial No. 095130274, filed Aug. 17, 2006, the subject matter of which is incorporated herein by reference.

BACKGROUND OF THE INVENTION

1. Field of the Invention

The invention relates in general to a computer system, and more particularly to a computer system having an embedded sub-system via which a booting firmware is accessed.

2. Description of the Related Art

Conventional computer system stores a boot code in a specialized flash memory of the motherboard, and the specialized flash memory is further connected to a low pin count (LPC) interface or a firmware hub (FWH) interface. Examples of the boot code include basic input output system (BIOS). As the computer system is booted, the computer system accesses the boot code from the specialized flash memory via LPC interface or the FWH interface. However, the conventional computer system still has many problems to resolve.

Conventional computer system needs to be equipped with a specialized flash memory for storing the boot code, further increasing costs for the computer system. Conventional computer system can only store the boot code in the specialized flash memory, hence the mechanism of storing the boot code is limited thereto. Therefore, conventional computer system does not have the flexibility of storing the boot code in memory devices other than the specialized flash memory. Furthermore, when updating the boot code of the computer system, conventional computer system can only update the boot code via a specialized program. Consequently, the procedure for updating the boot code becomes very complicated.

SUMMARY OF THE INVENTION

The invention is directed to a computer system and a booting firmware accessing method thereof. The computer system of the invention and the booting firmware accessing method thereof effectively resolve the problems encountered in conventional computer system, hence making it easier to update the boot code and dispensing with the installation of a specialized flash memory.

According to a first aspect of the present invention, a computer system is provided. The computer system comprises a main computer system and an embedded system. The embedded system comprises a memory device and a virtual firmware hub. The memory device is for storing a boot code of the main computer system. The virtual firmware hub connected to the main computer system and the memory device has a storage address in the memory device for storing the boot code. The virtual firmware hub is used for reading the boot code. As the main computer system is booted, the main computer system inputs a loading command to the virtual firmware hub. The virtual firmware hub reads the boot code stored in the memory device according to the loading command and outputs the boot code to the main computer system accordingly.

According to a second aspect of the present invention, a boot code accessing method is provided. The method comprises the following steps. Firstly, a computer system comprising a main computer system and an embedded system is provided, wherein the embedded system comprises a memory device and a virtual firmware hub. The memory device is for storing a boot code of the main computer system. Next, the address in which the memory device stores the boot code is set at the virtual firmware hub. Afterwards, the main computer system outputs a loading command to the virtual firmware hub, so that the boot code is read from the virtual firmware hub to boot the computer system.

The invention will become apparent from the following detailed description of the preferred but non-limiting embodiments. The following description is made with reference to the accompanying drawings.

DETAILED DESCRIPTION OF THE INVENTION

The computer system of the invention comprises a main computer system and an embedded system. The embedded system comprises a system on chip (SOC) and a memory device. The memory device stores a boot code of the main computer system. As the computer system of the invention is booted, the main computer system reads the boot code stored in the memory device via the system on chip, so that the main computer system is booted according to the boot code of the memory device.

Figure 1:
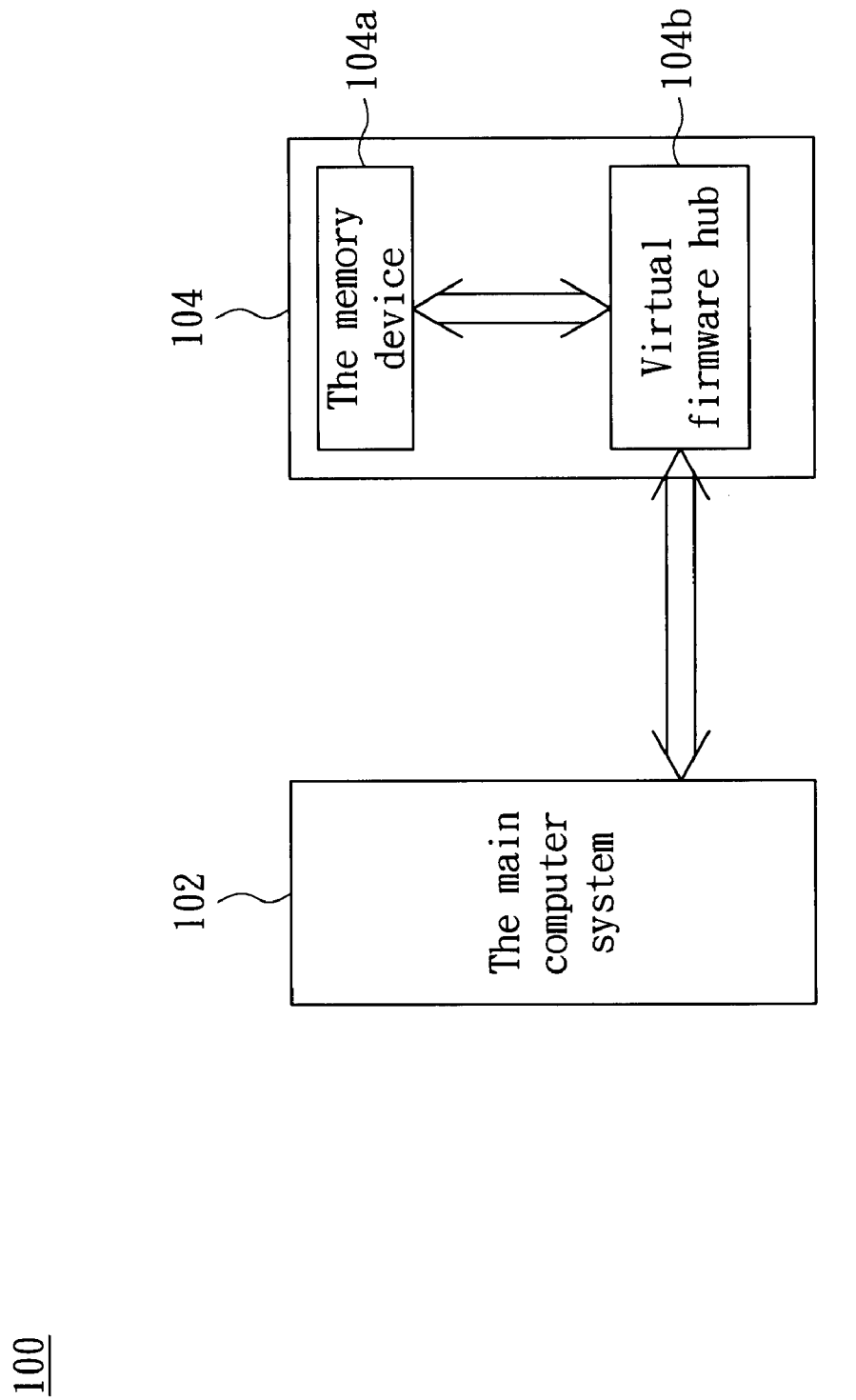
FIG. 1 is a circuit block diagram of a computer system according to an embodiment of the invention.

Referring to FIG. 1, a circuit block diagram of a computer system according to an embodiment of the invention is shown. The computer system 100 comprises a main computer system 102 and an embedded system 104. The embedded system 104 comprises a memory device 104a and a virtual firmware hub (VFWH) 104b. The virtual firmware hub 104b is coupled to the memory device 104a and the main computer system 102, respectively. The memory device 104a is for storing a boot code of the main computer system 102. The virtual firmware hub 104b has an address in which the memory device 104a stores the boot code. The virtual firmware hub 104b reads the boot code stored in the memory device 104a accordingly.

As the main computer system 102 is booted, the main computer system 102 inputs a boot code loading command to the virtual firmware hub 104b. Then, the virtual firmware hub 104b reads a boot code stored in the memory device 104a according to the boot code loading command and outputs the boot code to the main computer system 102 accordingly. Examples of the embedded system 104 of the present embodiment of the invention include a peripheral input/output bridge host. The main computer system 102 is coupled to the peripheral devices via the embedded system 102. The computer system 100 of the present embodiment of the invention can be embodied in three ways exemplified in three embodiments below.

First Embodiment

Figure 2:
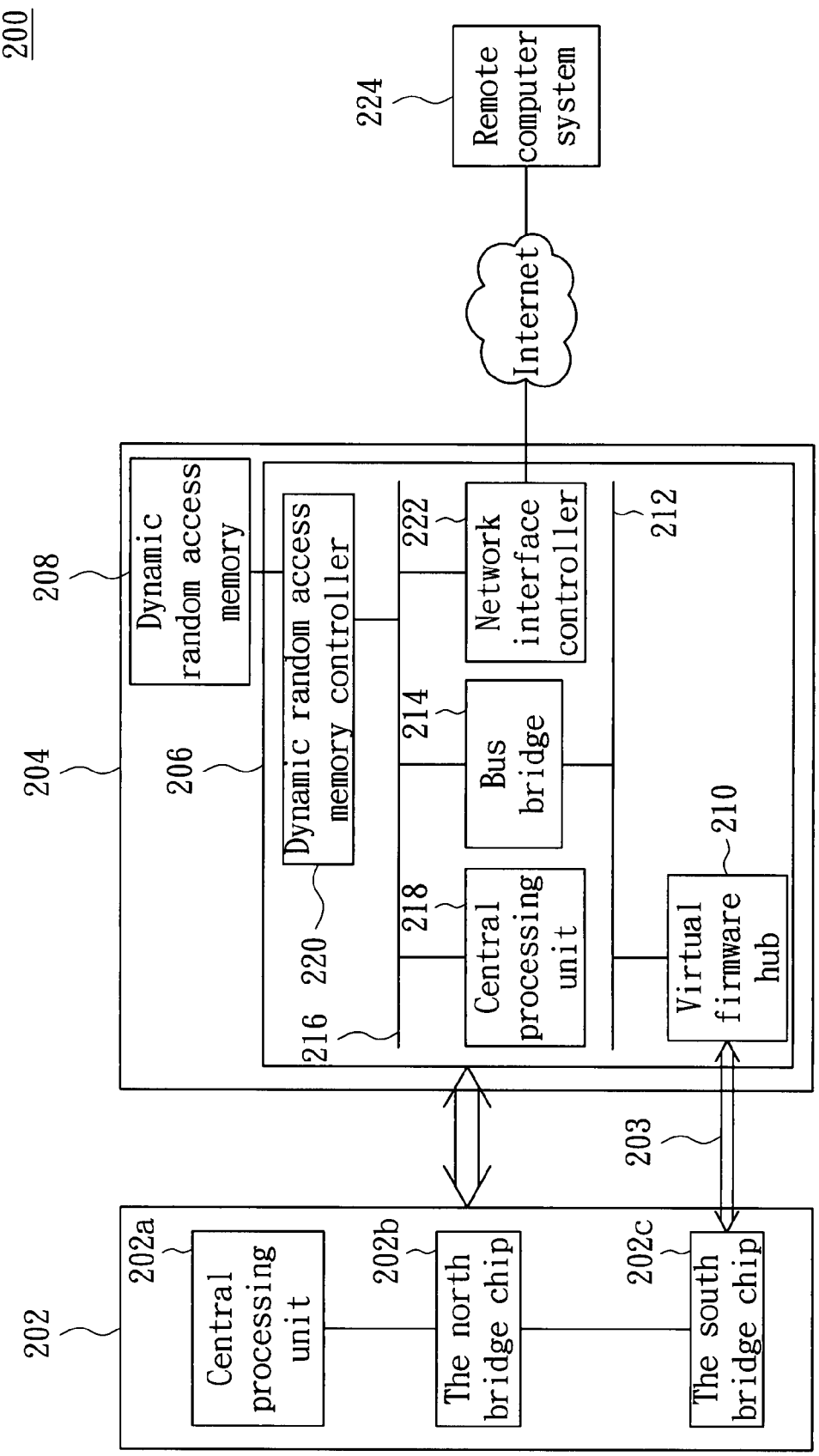
FIG. 2 is a circuit block diagram of a computer system according to a first embodiment of the invention.

Referring to FIG. 2, a circuit block diagram of a computer system according to a first embodiment of the invention is shown. The computer system 200 comprises a main computer system 202 and an embedded system 204. The main computer system 202 comprises a central processing unit 202a, a north bridge chip 202b and a south bridge chip 202c, wherein the north bridge chip 202b is coupled to the central processing unit 202a and the south bridge chip 202c, respectively.

The embedded system 204 comprises a system on chip (SOC) 206 and a dynamic random access memory 208. The system on chip 206 comprises a virtual firmware hub 210, a low-speed bus 212, a bus bridge 214, a high-speed bus 216, a central processing unit 218, a dynamic random access memory controller 220 and a network interface controller 222. One end of the virtual firmware hub 210 is connected to the south bridge chip 202c, and the other end is connected to one end of the bus bridge 214 via the low-speed bus 212. The other end of the bus bridge 214 is connected to the central processing unit 218, the dynamic random access memory controller 220 and the network interface controller 222 via the high-speed bus 216. The dynamic random access memory controller 220 is connected to the dynamic random access memory 208 for controlling the access of the dynamic random access memory 208.

The virtual firmware hub 210 and the south bridge chip 202c are connected and communicated via a boot code accessing interface 203. In the present embodiment of the invention, the boot code accessing interface 203 is exemplified by a low ping count (LPC) bus 203, and the south bridge chip 202c and the virtual firmware hub 210 are exemplified by a master end and a slave end of the LPC bus. The virtual firmware hub 210 is a master end of a bus. The virtual firmware hub 210 communicates with the dynamic random access memory controller 220 via the low-speed bus 212, the high-speed bus 216 and the bus bridge 214, and accesses the boot code stored in the dynamic random access memory 208.

The network interface controller 222 is connected to a remote computer system 224 via a network. The remote computer system 224 is for storing a boot code of the main computer system 202. The central processing unit 218 controls the embedded system 204 to read the boot code stored in the remote computer system 224 before the main computer system 202 is booted, so as to store the boot code of the remote computer system 224 in the dynamic random access memory 208, and further sets the address in which the dynamic random access memory 208 stores the boot code at the virtual firmware hub 210.

As the main computer system 202 is booted, the south bridge chip 202c outputs a boot code loading command to the virtual firmware hub 210 via the LPC bus. The virtual firmware hub 210 communicates with the dynamic random access memory controller 220 via a path formed by a low-speed bus 212, a bus bridge 214, a high-speed bus 216, so as to access the boot code from the dynamic random access memory 208. After the boot code is accessed, the virtual firmware hub 210 inputs the boot code to the south bridge chip 202c via the LPC bus, so that the main computer system 202 is booted according to the boot code stored in the dynamic random access memory 208.

Examples of the dynamic random access memory 208 of the present embodiment of the invention include a dynamic random access memory attached to the embedded system 204. Thus, the computer system 200 of the present embodiment of the invention dispenses with a specialized flash memory in which the boot code of the main computer system 202 is stored. Besides, the computer system 200 of the present embodiment of the invention may store the boot code of the main computer system 202 in any remote computer system 224 which can be connected to the embedded system 204 via a network. Thus, the computer system 200 of the present embodiment of the invention resolves the problems encountered in a conventional computer system, and there is no need to install a specialized flash memory for storing the boot code, hence dispensing with the installation of a specialized flash memory which may incur more cost and making the method for storing the boot code more flexible.

Furthermore, as the boot code is stored in the remote computer system 224 in the present embodiment of the invention, the main computer system 202 can directly update the boot code stored in the remote computer system 224 via a network when the boot code of the main computer system 202 needs to be updated. Thus, the computer system 200 of the present embodiment of the invention effectively simplifies the operating procedure for updating the boot code update of conventional computer system.

Figure 3:
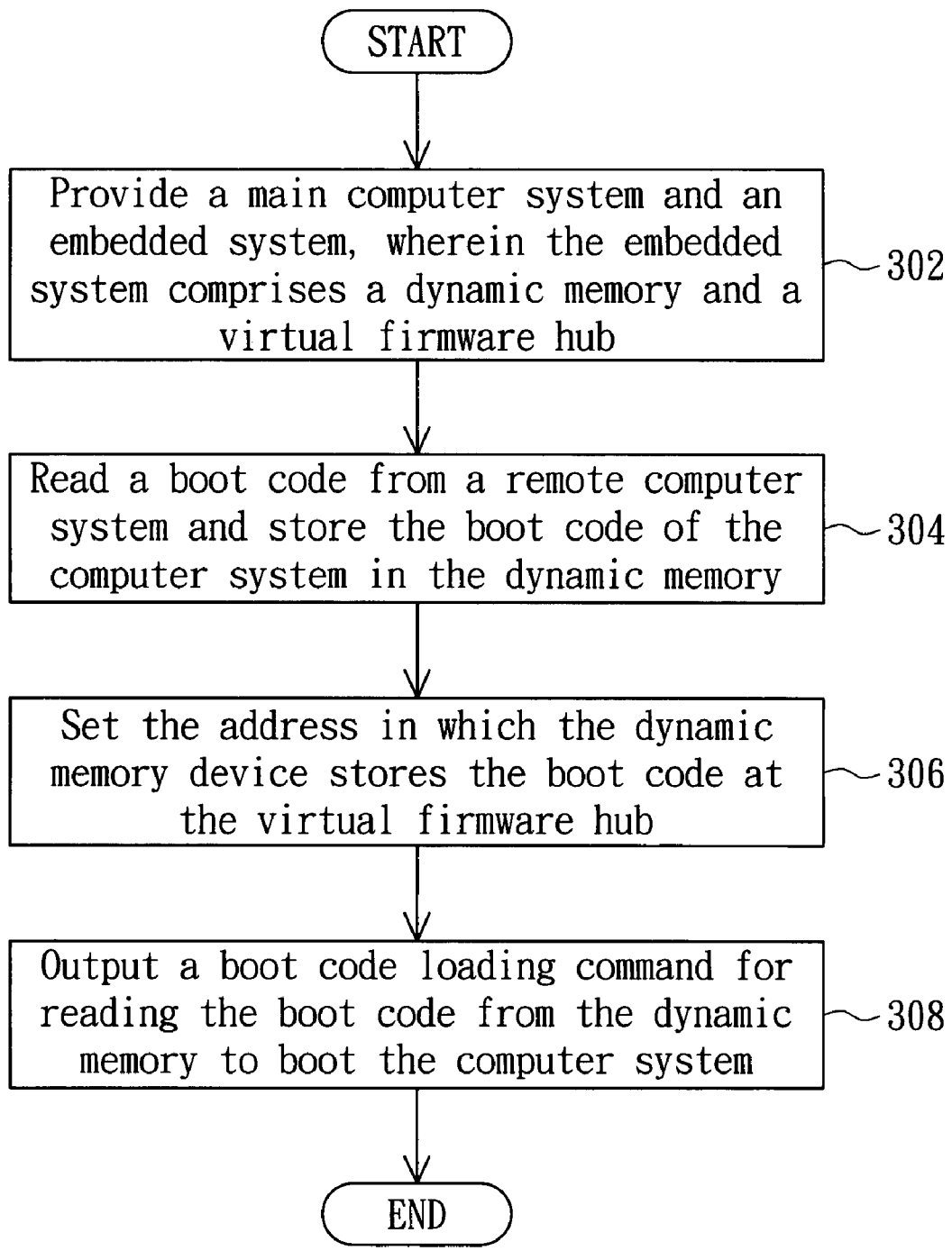
FIG. 3 is a flowchart of a boot code accessing method of the computer system 200 of FIG. 2.

Referring to FIG. 3, a flowchart of a method for assessing a boot code of the computer system 200 of FIG. 2 is shown. Firstly, the method begins with step 302, a main computer system 202 and an embedded system 204 are provided, wherein the embedded system 204 comprises a dynamic random access memory 208 and a virtual firmware hub 210. Next, the method proceeds to step 304, a boot code is read from a remote computer system 224 and stored in a dynamic random access memory 208.

Then, the method proceeds to step 306, the address in which the dynamic random access memory 208 stores the boot code is set at the virtual firmware hub 210. Afterwards, the method proceeds to step 308, the main computer system 202 outputs a boot code loading command to the virtual firmware hub 210 for reading the boot code from the dynamic random access memory 208 via the virtual firmware hub 210 to boot the computer system.

The computer system of the present embodiment of the invention has an embedded system in the main computer system, and stores the boot code of the main computer system in a remote computer system which is connected to the embedded system via a network. As the main computer system is booted, the embedded system accesses the boot code stored in the remote computer system and stores the boot code in a dynamic random access memory of the embedded system. The main computer system reads the boot code from dynamic random access memory via the embedded system to boot the computer system. The computer system of the present embodiment of the invention dispenses with the use of a specialized flash memory, hence effectively resolving the problems encountered in a conventional computer system. Consequently, the computer system does not need to install a specialized flash memory for booting the system, and the updating procedure of the boot code is further simplified. Therefore, the computer system of the present embodiment of the invention has the advantages of lower costs, more flexibility in storing the boot code, and simpler updating procedure of the boot code update.

Second Embodiment

Figure 4:
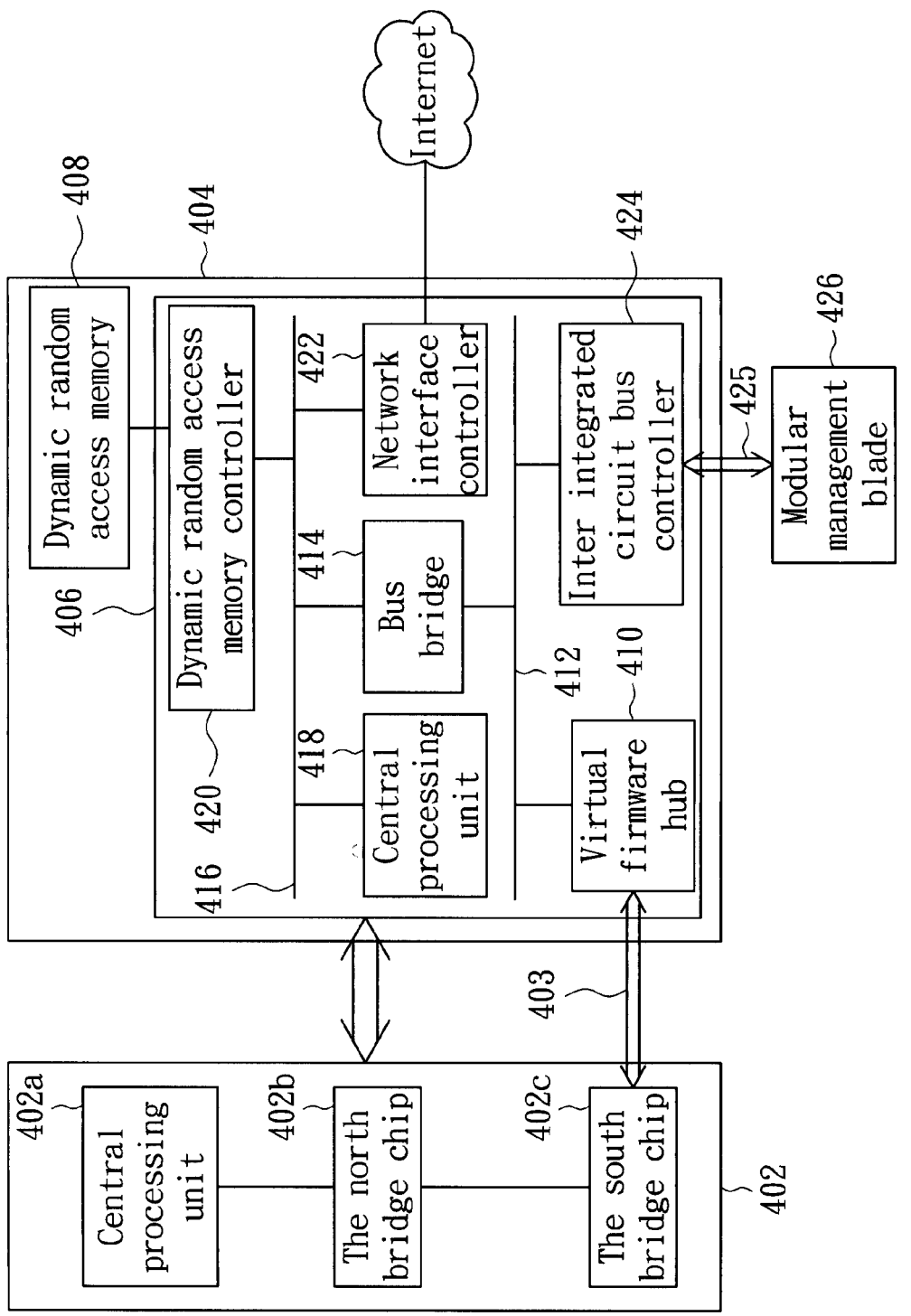
FIG. 4 is a circuit block diagram of a computer system according to a second embodiment of the invention.

Referring to FIG. 4, a circuit block diagram of a computer system according to a second embodiment of the invention is shown. The present embodiment of the invention differs with the first embodiment in the computer system 400 further comprises a bus controller for the communication between devices. Example of the communication bus controller includes an inter integrated circuit (I²C) bus controller 424. The I²C bus controller 424 is connected to another embedded system 426 via an I²C bus 425. In the present embodiment of the invention, the computer system 400 and the embedded system 426 are exemplified by a PC blade and a modular management blade (MMB) thereof, respectively.

The boot code of the PC blade is stored in the MMB 426. The central processing unit 418 controls the embedded system 404 to read the boot code stored in the MMB 426 before the main computer system 402 is booted, store the boot code of MMB 426 in a dynamic random access memory 408, and set the address in which the dynamic random access memory 408 stores the boot code at a virtual firmware hub 410. Afterwards, the main computer system 402 reads the boot code stored in the MMB 426 via the embedded system 404 to boot the computer system.

Figure 5:
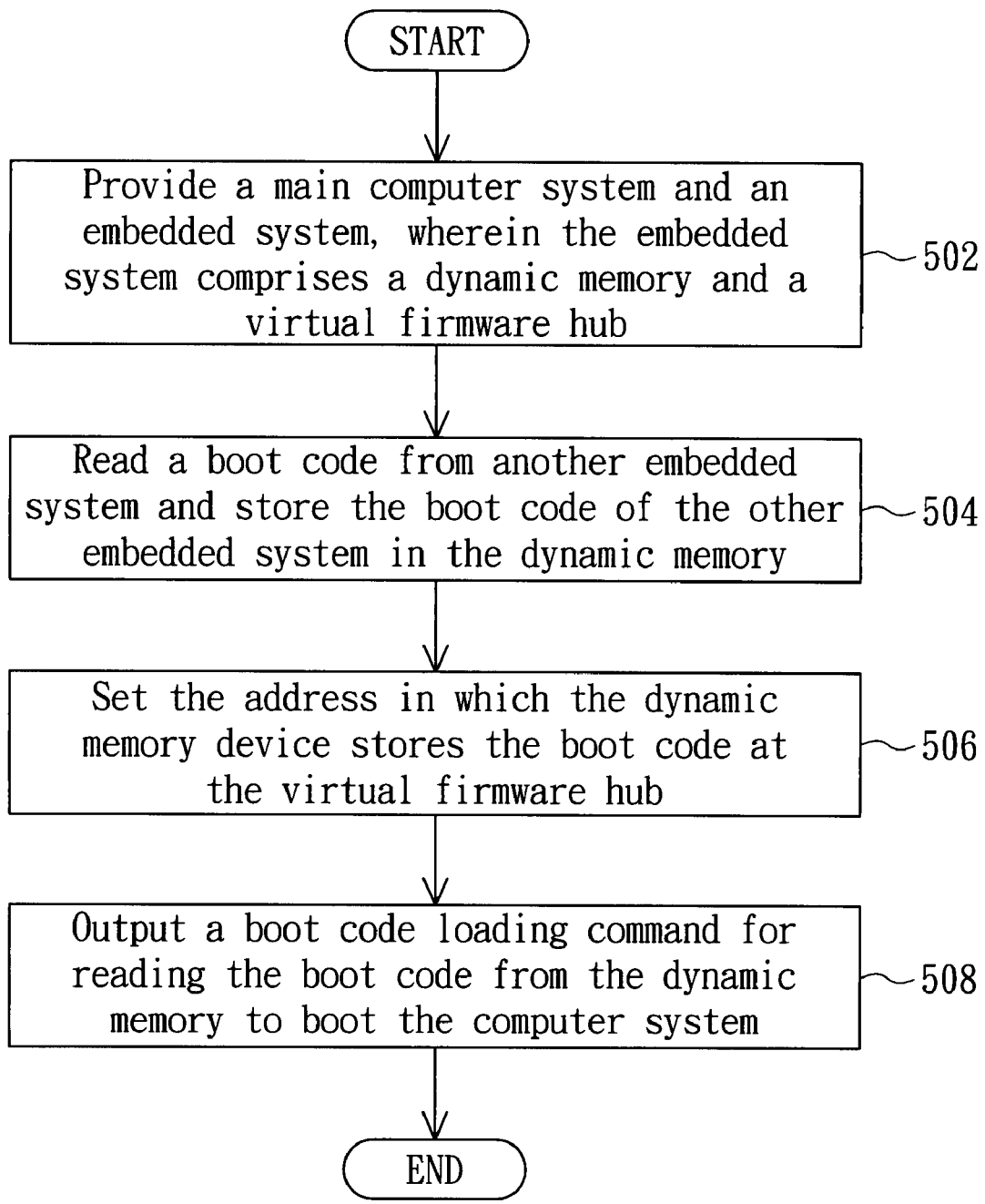
FIG. 5 is a flowchart of a method for assessing a boot code of the computer system 400 of FIG. 4.

Referring to FIG. 5, a flowchart of a method for assessing a boot code of the computer system 400 of FIG. 4 is shown. The boot code accessing method of the present embodiment of the invention differs with the boot code accessing method of the first embodiment in step 504. In step 504, a boot code is read from the MMB 426 and stored in the dynamic random access memory 408.

In the present embodiment of the invention, the bus controller for the communicating between devices is exemplified by I²C bus controller 424. However, the communication bus controller of the present embodiment of the invention is not limited to the I²C bus, and other types of buses are also applicable.

According to the computer system of the present embodiment of the invention, an embedded system is disposed in the main computer system, and the boot code of the main computer system is stored in the MMB 426 connected to the embedded system via an I²C bus. Before the main computer system is booted, the embedded system accesses the boot code stored in the MMB 426 and stores the boot code in a dynamic random access memory of the embedded system. The main computer system reads the boot code stored in the dynamic random access memory via the embedded system to boot the computer system. The computer system of the present embodiment of the invention dispenses with the use of a specialized flash memory, hence effectively resolving the problems encountered in a conventional computer system. Consequently, the computer system does not need to install a specialized flash memory for booting the system, and the updating procedure of the boot code is further simplified. Therefore, the computer system of the present embodiment of the invention has the advantages of lower costs, more flexibility in storing the boot code, and simpler updating procedure of the boot code update.

Third Embodiment

Figure 6:
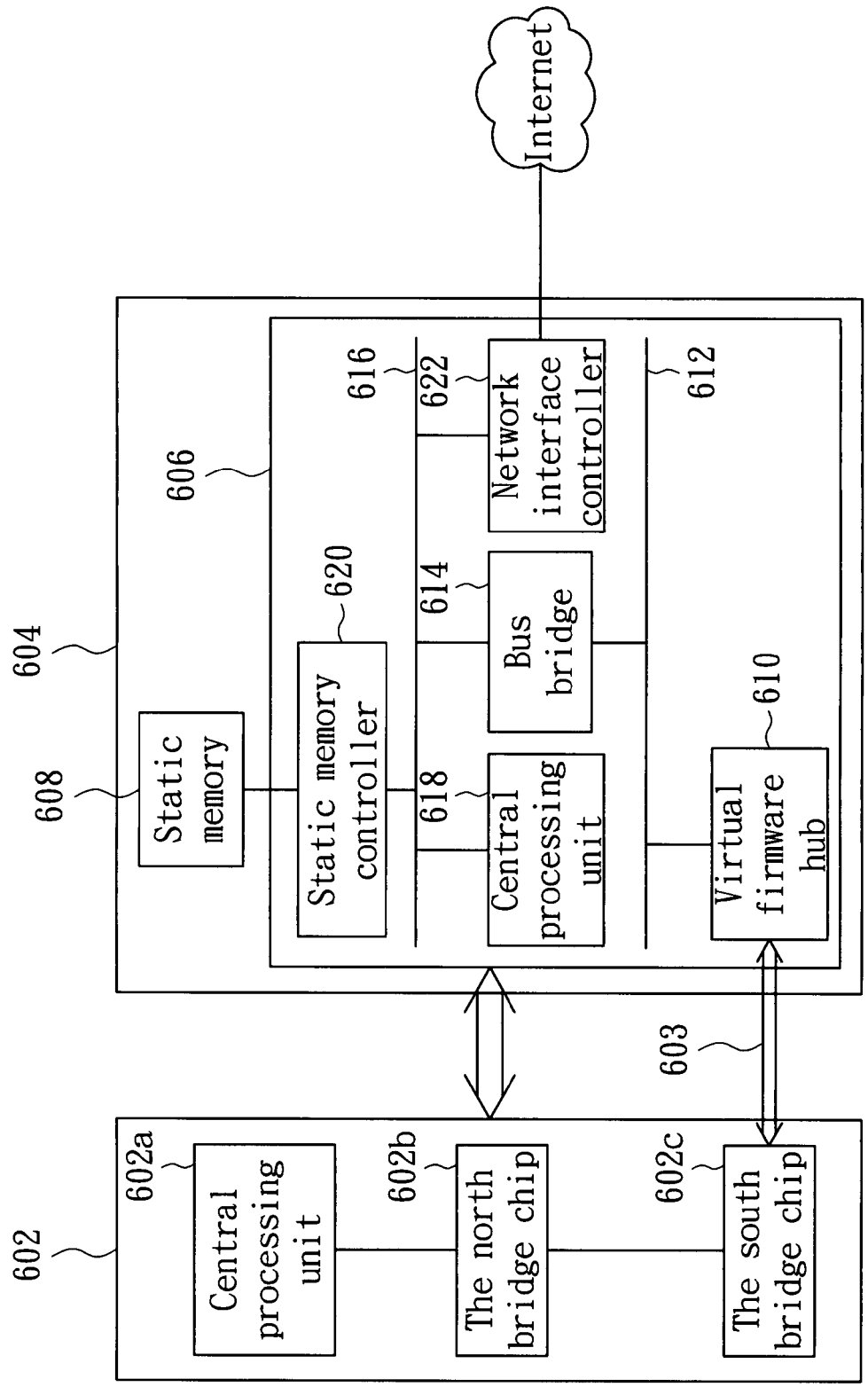
FIG. 6 is a circuit block diagram of a computer system according to a third embodiment of the invention.

Referring to FIG. 6, a circuit block diagram of a computer system according to a third embodiment of the invention is shown. The present embodiment of the invention differs with the first embodiment in that the embedded system 604 further comprises a static memory 608 and a static memory controller 620. The static memory controller 620 is connected to a central processing unit 618, a network interface controller 622 and a bus bridge 614 via a high-speed bus 616. The static memory controller 620 is connected to a static memory 608 for controlling the access of the static memory 608. The static memory 608 is for storing a boot code of the main computer system 602. The virtual firmware hub 610 has the address in which the static memory 608 for storing the boot code. The static memory 608 of the present embodiment of the invention is a flash memory attached to the embedded system 604.

As the main computer system 602 is booted, the south bridge chip 602c outputs a boot code loading command to the virtual firmware hub 610 via an LPC bus 603. The virtual firmware hub 610 is connected to the static memory controller 620 via the path formed by a low-speed bus 612, a bus bridge 614, and a high-speed bus 616. The virtual firmware hub 610 accesses the boot code of the static memory 608. After the boot code is accessed, the virtual firmware hub 610 inputs the boot code to the south bridge chip 602c via the LPC bus 603.

Thus, the computer system 600 of the present embodiment of the invention integrates the specialized flash memory for storing the boot code of the main computer system 602 with the flash memory of the embedded system 604, hence a specialized flash memory for storing the boot code of the main computer system 602 is dispensed, and the boot code of the main computer system 602 may be stored in any static memory which can be connected to the system on chip 606. Therefore, the computer system of the present embodiment of the invention does not need to install a specialized flash memory for storing the boot code, not only saving manufacturing cost but also making the storage of the boot code more flexible.

In the present embodiment of the invention, the boot code is stored in the static memory of the embedded system 604, and when the boot code of the main computer system 602 is to be updated, the main computer system 602 may directly update the boot code of the embedded system 604 via a network. Thus, the computer system 600 of the present embodiment of the invention also effective simplifies the procedure of updating the boot code of conventional computer system.

Figure 7:
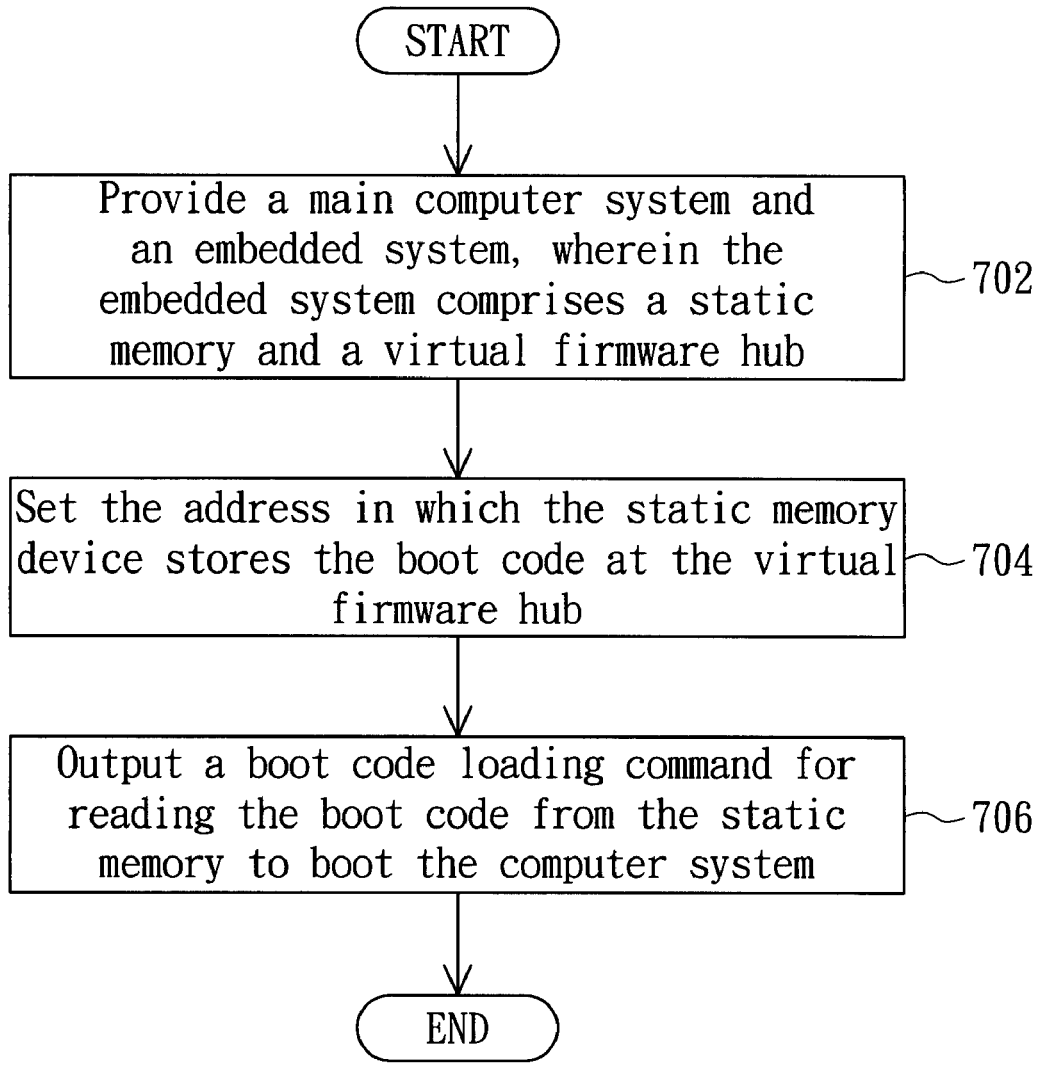
FIG. 7 is a flowchart of a method for assessing a boot code of the computer system 600 of FIG. 6.

Referring to FIG. 7, a flowchart of a method for assessing a boot code of the computer system 600 of FIG. 6 is shown. The boot code accessing method of the present embodiment of the invention differs with the boot code accessing method of the first embodiment and the second embodiment in that the present embodiment of the invention stores the boot code of the main computer system 602 in a static memory 608 of the embedded system 604. Therefore, the boot code accessing method of the present embodiment of the invention differs with the boot code accessing method of the first embodiment in steps 702, 704 and 706.

In step 702, a main computer system 602 and an embedded system 604 are provided, wherein the embedded system comprises a static memory 608 and a virtual firmware hub 610. In step 704, a boot code of the main computer system 602 is stored in a static memory 608. In step 706, the address in which the static memory 608 stores the boot code is set at a virtual firmware hub 610. Further, the boot code accessing method of the present embodiment of the invention dispenses with the step of storing the boot code stored in the remote computer system 224 or the embedded system 426 to the dynamic random access memories 208 and 408.

According to the computer system of the present embodiment of the invention, an embedded system is set in the main computer system, and the boot code of the main computer system is stored in the static memory of the embedded system. As the main computer system is booted, the main computer system reads the boot code stored in the static memory via the embedded system to boot the computer system. The computer system of the present embodiment of the invention dispenses with the use of a specialized flash memory, hence effectively resolving the problems encountered in a conventional computer system. Consequently, the computer system does not need to install a specialized flash memory for booting the system, and the updating procedure of the boot code is further simplified. Therefore, the computer system of the present embodiment of the invention has the advantages of lower costs, more flexibility in storing the boot code, and simpler updating procedure of the boot code update.

In other embodiments of the computer system, the embedded system includes a dynamic memory, a static memory, a network interface controller and an I²C bus controller. Therefore, the embedded system can select one from the static memory, the remote computer system, or the MMB for reading the boot code. Compared with a conventional computer system, the method for reading the boot code provided in the invention is more flexible.

In the above embodiments, despite the boot code accessing interfaces 203, 403, and 603 are exemplified by an LPC interface bus, however, the boot code accessing interfaces 203, 403 and 603 of the above embodiments are not limited to an LPC interface bus, and other forms of bus such as firmware hub interface for example also do.

The main computer systems 202, 402 and 602 are connected to other peripheral devices via the embedded systems 204, 404 and 604, respectively. At least one peripheral bus, such as peripheral component interconnect interface (PCI), serial digital video output (SDVO) port, universal serial bus (USB), system management bus (SMB), and general purpose input and output (GPIO) port of the main computer systems 202, 402 and 602 are connected to the embedded system 204, 404 and 604 for connecting other peripheral devices via them.

The main computer systems 202, 402 and 602 of the above embodiments are PC blades. Each of the PC blades 202, 402 and 602 is a complete computer host which communicates with the user interface devices at the remote end, such as screen, speaker, keyboard or mouse, through the embedded systems 204, 404 and 604 and the network. A number of PC blades are grouped to form a blade PC. The blade PC has an MMB to control the operation of blade PC such as the voltage, the temperature, the power, the rotation speed of the fan and information of other hardware devices. The MMB can further be connected to an external manager via the network to monitor the blade PC. The embedded system 204 and 404 of the above embodiments are powered by a stand-by power of the computer systems 200 and 400. Thus, the central processing units 218 and 418 are able to drive the embedded system 204 and 404 to read the boot code stored in the remote computer system 224 and the MMB 426 before the main computer system 202 and 402 is booted the computer system. Besides, the embedded system can receive the main power of the computer system to read the boot code for enabling the main computer system to boot.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a main computer system;
   an embedded system, comprising:
   a memory device for storing a boot code of the main computer system; and
   a virtual firmware hub connected to the main computer system and the memory device, wherein the virtual firmware hub is for reading the boot code;
   wherein, as the main computer system is booted, the main computer system outputs a loading command to the virtual firmware hub, the virtual firmware hub reads the boot code according to the loading command and outputs the boot code to the main computer system accordingly, so that the main computer system can boot up without any use of main computer system internal boot code memories.

2. The computer system according to 1, wherein the memory device is a flash memory.

3. The computer system according to 2, wherein the embedded system further comprises:
   a static memory controller coupled to the flash memory for controlling the access of the flash memory; and
   a bridge for connecting the static memory controller with the virtual firmware hub, so that the virtual firmware hub reads the boot code via the static memory controller.

4. The computer system according to 1, wherein the memory device is a dynamic random access memory (DRAM).

5. The computer system according to 4, wherein the embedded system further comprises:
   a data transmission interface via which the embedded system is coupled to a remote access device, wherein the remote access device is for storing the boot code;
   a dynamic random access memory (DRAM) controller coupled to the dynamic random access memory for controlling the access of the dynamic random access memory; and
   a central processing unit (CPU) coupled to the dynamic random access memory and the data transmission interface for controlling the embedded system to read the boot code from the remote storage device and store the boot code to the dynamic random access memory via the dynamic random access memory controller, wherein the central processing unit further sets the address in which the dynamic random access memory stores the boot code at the virtual firmware hub.

6. The computer system according to 5, wherein the data transmission interface is a network interface, and the remote access device is a remote computer system.

7. The computer system according to 5, wherein the data transmission interface is an inter integrated circuit (I²C) interface.

8. The computer system according to 7, wherein the remote access device is a modular management blade (MMB).

9. The computer system according to 1, wherein the computer system is a PC blade system.

10. The computer system according to 1, wherein the main computer system further comprises a south bridge chip via which the main computer system is connected to the virtual firmware hub, and the south bridge chip is connected to the virtual firmware hub via a boot code storage interface.

11. The computer system according to 10, wherein the boot code storage interface is a low pin count (LPC) interface, the south bridge chip is a master end of the LPC interface, and the virtual firmware hub is a slave end of the LPC interface.

12. A boot code accessing method, comprising:
   providing a main computer system and an embedded system, wherein the embedded system comprises a memory device and a virtual firmware hub, and the memory device is for storing a boot code of the main computer system;
   setting the address in which the memory device stores the boot code at the virtual firmware hub; and
   outputting a loading command for reading the boot code stored in the memory device to boot the computer system, so that the main computer system can boot up without any use of main computer system internal boot code memories.

* * * * *